No. 698,047. Patented Apr. 22, 1902.
J. A. OLSON.
FIRE ALARM.
(Application filed Jan. 15, 1901.)
(No Model.)
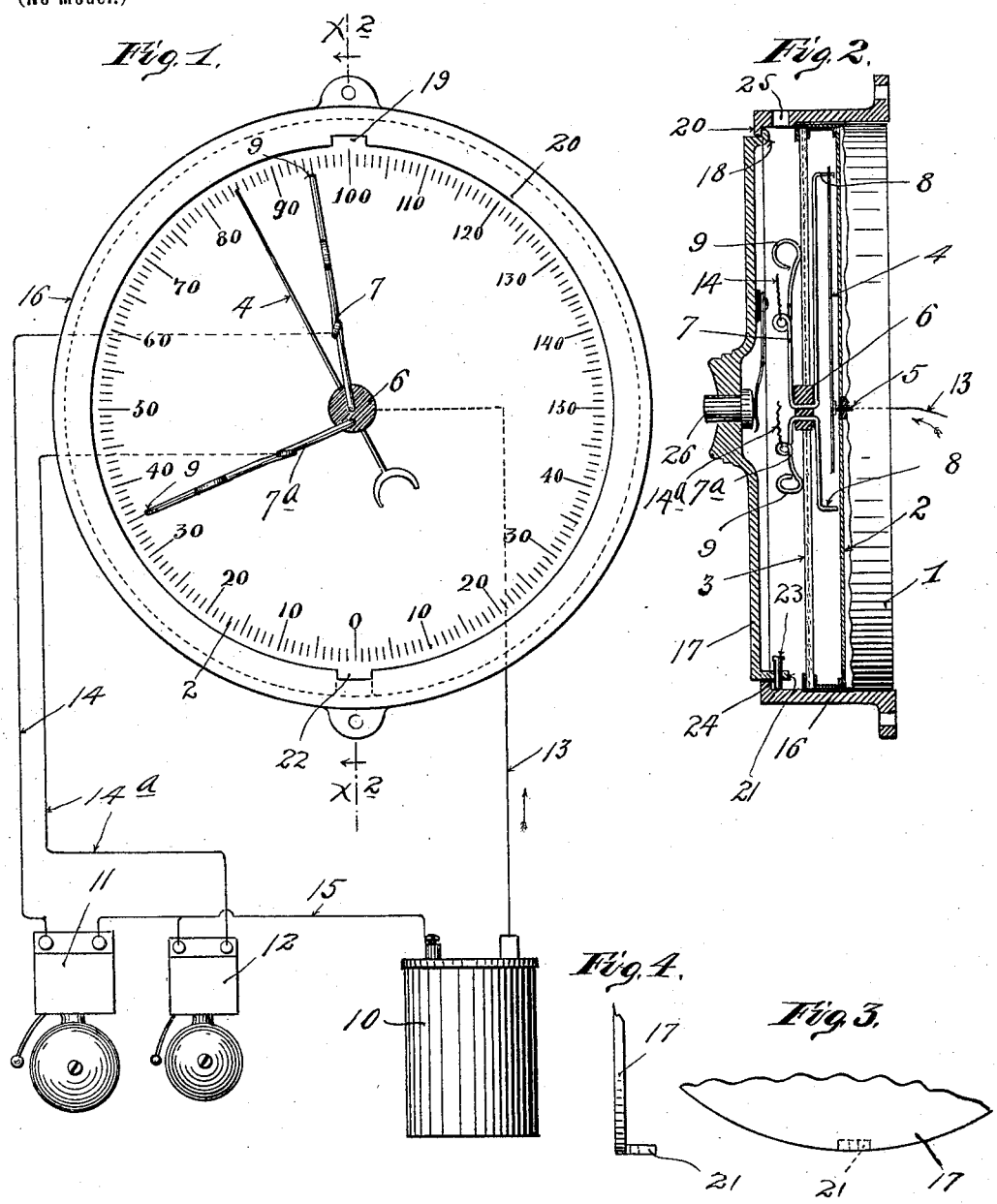
Witnesses.
a. H. Opsahl.
Harry Kilgore.
Inventor.
John. A. Olson.
By his Attorneys
Williamson & Merchant.

UNITED STATES PATENT OFFICE.

JOHN A. OLSON, OF MINNEAPOLIS, MINNESOTA.

FIRE-ALARM.

SPECIFICATION forming part of Letters Patent No. 698,047, dated April 22, 1902.

Application filed January 15, 1901. Serial No. 43,338. (No model.)

*To all whom it may concern:*

Be it known that I, JOHN A. OLSON, a citizen of the United States, residing at Minneapolis, in the county of Hennepin and State of Minnesota, have invented certain new and useful Improvements in Fire-Alarms; and I do hereby declare the following to be a full, clear, and exact description of the invention, such as will enable others skilled in the art to which it appertains to make and use the same.

My invention has for its object to provide an improved alarm device especially adapted for use in connection with thermometers, wherein a pointer is under the varying temperature moved over a dial; but my said invention is capable of a much more general use, as will hereinafter be noted.

To the ends above indicated the invention consists of the novel devices and combinations of devices hereinafter described, and defined in the claims.

The invention is illustrated in the accompanying drawings, wherein like characters indicate like parts throughout the several views.

Figure 1 is a view, partly in diagram and partly in front elevation, showing a thermometer of standard construction with my invention applied thereto, some parts being removed. Fig. 2 is a vertical section on the line $x^2$ $x^2$ of Fig. 1, some parts being broken away and others shown in full. Fig. 3 is a detail in front elevation, showing a portion of the removable case-disk; and Fig. 4 is a side elevation of the part shown in Fig. 3.

The numeral 1 indicates the case, the numeral 2 the dial, the numeral 3 the transparent crystal or cover, preferably of glass, and the numeral 4 the pointer, of an ordinary or standard thermometer. The pointer 4 is carried by a short spindle 5, to which the thermally-actuated controller (not shown) is connected. For the purposes of this case it is only necessary to state that the pointer 4 is by its controller moved in the direction of the increasing numbers "0" to "150," as marked on the dial 2, under increasing temperature and is moved in a reverse direction under decreasing temperature.

At or in the vicinity of the center of the glass disk or crystal 3 a hole is bored or otherwise formed, and this hole is plugged by a block 6 of insulating material, preferably vulcanized rubber. Through this plug 6 a pair of electrodes 7 $7^a$ are pivotally mounted. These electrodes 7 and $7^a$ are preferably formed of brass or copper wire, and the inner ends of the same are extended radially and are then offset or bent laterally to form fingers 8 for engagement with the free end of the pointer 4. The outer ends of these electrodes 7 $7^a$ are also extended radially and are bent at their outer ends to form spring-sections 9, which frictionally engage the outer face of the crystal 3 and hold the contact-fingers 8 in whatever relative adjustments they may be set.

The numeral 10 indicates the single cell of a battery, and the numerals 11 and 12 indicate a pair of electrically-actuated bells. A lead-wire 13 connects the battery 10 with the stem 5 of the pointer 4. A wire 14 connects the electrode 7 with the bell 11, and a wire $14^a$ connects the electrode $7^a$ with the battery 12. A common wire 15 connects both bells 11 and 12 with the battery 10. With this construction it is evident that when the pointer 4 is brought into contact with the electrode 7 the circuit through the bell 11 will be closed and the said bell will be sounded. It is equally evident that when the said pointer 4 is thrown into contact with the electrode $7^a$ the circuit to the bell 12 will be closed and the said bell 12 will be sounded. The said bells 11 and 12 are shown as of different size, and it is intended that they shall have very different tones, so that a person familiar with their sound may be able to readily tell whether it is an overtemperature or an undertemperature that has caused the alarm. As the electrodes are readily adjustable, they may of course be set so that an alarm will be sounded whenever the temperature varies below one point or above another.

Hitherto in devices of this character it has been found necessary to cut up quite badly the case and dial, with the further objectionable result that openings have been left through which dust and dirt may readily enter. As is evident by the arrangement above described, no openings are left through which the dust can pass, and the dial is left intact.

To prevent tampering with the electrodes or other parts of the device, it is preferably inclosed by a case made up of an annular marginal section 16 and a removable disk 17. The annular section 16 is adapted to be secured to the wall or to any other suitable support. The disk 17 is provided at its upper portion with an inwardly-projecting hook portion 18, which is adapted to enter a notch 19 in the annular section 16 and to engage behind a detent or flanged section 20 thereof. The disk 17 is further provided at its lower portion with an inwardly-projecting ear 21, which is adapted to enter a notch 22, cut in the lower flanged portion of the annular section 16, and this ear is provided with a loose pin 23, which is adapted to drop behind the shoulder portion 24 of the said section 16 to lock the case-sections together. In the top portion of the case-section 16 is a perforation 25, through which a suitable long tool may be entered to release the lock-pin 23 when it is desired to reset the electrodes 7 and 7ª. At its central portion the disk 17 is shown as provided with a push-button 26, which, however, forms no part of my present invention. The push-button 26 may be connected in circuit in the ordinary way with an electrically-actuated bell, and thereby used as a call device.

The improved device above described may of course be used in connection with steam-gages and similar devices, and even when used in connection with a thermometer the electric circuit or circuits opened and closed thereby may be used to control devices other than bells and might be utilized to automatically control the draft devices for furnaces. It will also be understood that the invention above described is capable of modification as to its details of construction. For instance, the electrodes might be pivotally mounted in the back of the thermometer-case; but this would not by any means be the full equivalent of the arrangement described.

This device is especially intended for use either as a fire-alarm or as a temperature-indicator where it is desired that a signal should be given either at a local or a distant point whenever the temperature varies either above or below certain limits. As a fire-alarm its many uses are obvious. It is especially well adapted for use in hotels and other public places, where it may be either portable or stationary. When stationary, it may operate a bell or annunciator at a central station or at any distant point either within or without the hotel, and it may, as already indicated, be used in connection with a push-button signal system. Simply as a temperature-indicator it is of great service in school-buildings, hospitals, cold-storage warehouses, and various other places where it is important that the temperature should be kept within certain restricted limits.

What I claim, and desire to secure by Letters Patent of the United States, is as follows:

1. A device of the character described involving a case having a dial and a crystal spaced apart, the latter outward of the former, in combination with a vibrating pointer having a spindle which projects axially through said dial, an adjustable electrode mounted to oscillate in the space between said dial and crystal and provided with a stem which works outward through said crystal approximately at the axis thereof, and a finger-piece secured to the outwardly-projected end of the stem of said electrode, and an electric circuit including said pointer and said electrode and involving an element which is actuated by the closing of the circuit between said pointer and electrode, substantially as described.

2. A device of the character described involving a case and a crystal spaced apart, the latter outward of the former, in combination with a vibrating pointer having a spindle which projects axially through said dial, a pair of independently-movable electrodes cooperating with said pointer and working in the space between said dial and said crystal and provided with stem portions which work outward through said crystal at offset points on, but approximately at the axis of, said crystal, finger-pieces on the outer ends of the stems of said electrodes, and an electric circuit including said pointer and said two electrodes and involving one or more elements which are actuated by the closing of the circuit between said pointer and either of said electrodes, substantially as described.

3. The combination with the case 1, dial 2, crystal 3 and thermally-actuated pointer 4, of the insulating-plug 6 extending through the central portion of said crystal 3, the electrodes 7, 7ª, pivoted in said plug 6, provided at their inner ends with contact-fingers 8 and at their outer ends with the crystal-engaging spring-sections 9, a pair of bells, circuit connections from said bells to said pointer, and independent circuit connections from said bells to the said two electrodes, substantially as described.

In testimony whereof I affix my signature in presence of two witnesses.

JOHN A. OLSON.

Witnesses:
 ANNE S. READ,
 F. D. MERCHANT.